United States Patent
Labanca, Jr. et al.

(10) Patent No.: US 10,540,634 B1
(45) Date of Patent: Jan. 21, 2020

(54) VERSION RECALL FOR COMPUTERIZED DATABASE MANAGEMENT

(71) Applicant: Square, Inc., San Francisco, CA (US)

(72) Inventors: John Joseph Labanca, Jr., Dunwoody, GA (US); Roger Reyelts, Marietta, GA (US); Cynthia Lobb, Marietta, GA (US)

(73) Assignee: Square, Inc., San Francisco, CA (US)

( * ) Notice: Subject to any disclaimer, the term of this patent is extended or adjusted under 35 U.S.C. 154(b) by 132 days.

(21) Appl. No.: 15/874,717

(22) Filed: Jan. 18, 2018

Related U.S. Application Data

(63) Continuation of application No. 15/446,975, filed on Mar. 1, 2017, now Pat. No. 9,916,563.

(51) Int. Cl.
G06Q 10/06 (2012.01)
G06Q 10/08 (2012.01)
G06Q 30/02 (2012.01)

(52) U.S. Cl.
CPC ..... G06Q 10/0875 (2013.01); G06Q 30/0283 (2013.01)

(58) Field of Classification Search
CPC .. G06Q 10/0875; G06Q 10/087; G06Q 10/06; G06Q 30/04; G06Q 40/10; G06K 2017/0051
USPC ...................................... 705/28–30
See application file for complete search history.

(56) References Cited

U.S. PATENT DOCUMENTS

| | | | |
|---|---|---|---|
| 6,032,126 A | 2/2000 | Kaehler | |
| 6,236,997 B1 | 5/2001 | Bodamer et al. | |
| 6,397,212 B1 | 5/2002 | Biffar | |
| 6,519,568 B1 | 2/2003 | Harvey et al. | |
| 6,917,922 B1 | 7/2005 | Bezos et al. | |
| 7,000,016 B1 * | 2/2006 | Vanderbeck | H04L 67/1008 709/203 |
| 7,013,290 B2 | 3/2006 | Ananian | |
| 7,099,447 B2 | 8/2006 | McQuilkin et al. | |
| 7,133,882 B1 | 11/2006 | Pringle et al. | |
| 7,225,159 B2 | 5/2007 | DeMello et al. | |

(Continued)

OTHER PUBLICATIONS

Non-Final Office Action dated Dec. 12, 2018, for U.S. Appl. No. 15/446,882, of Reyelts, R., et al., filed Mar. 1, 2017.

(Continued)

Primary Examiner — Andrew Joseph Rudy
(74) Attorney, Agent, or Firm — Lee & Hayes, P.C.

(57) ABSTRACT

Techniques for effectuating a rollback to a previous version of a database (e.g., a catalog or inventoy database) associated with an entity are described. A payment processing service may receive instructions to modify a database. The payment processing service may modify the database based at least partly on the instructions and add an entry to a modification log. Each entry in the modification log may correspond to a previous version of the database and the entry may correspond to a new version of the database after the modification to the database. The payment processing service may determine that the modification to the database is likely to warrant a rollback and may effectuate the rollback by determining a previous entry of the modification log that precedes the entry and adding a new entry to the modification log that corresponds to the previous version of the database associated with the previous entry.

20 Claims, 6 Drawing Sheets

(56) References Cited

U.S. PATENT DOCUMENTS

| | | | |
|---|---|---|---|
| 7,552,150 B2* | 6/2009 | Olson-Williams | G06F 16/22 |
| 7,565,310 B2 | 7/2009 | Gao et al. | |
| 7,577,907 B2 | 8/2009 | Vishnia-Shabtai et al. | |
| 7,636,728 B2 | 12/2009 | Novak | |
| 7,738,497 B2 | 6/2010 | Vishnia-Shabtai et al. | |
| 8,065,189 B1 | 11/2011 | Ballaro | |
| 8,065,202 B1 | 11/2011 | Ballaro et al. | |
| 8,069,096 B1 | 11/2011 | Ballaro et al. | |
| 8,103,557 B2 | 1/2012 | Hanai et al. | |
| 8,103,728 B2* | 1/2012 | Johnson | H04L 67/1095 |
| | | | 707/609 |
| 8,112,317 B1 | 2/2012 | Ballaro et al. | |
| 8,271,452 B2* | 9/2012 | Longshaw | G06F 11/1471 |
| | | | 707/664 |
| 8,463,658 B2 | 6/2013 | Racco | |
| 8,626,741 B2 | 1/2014 | Vijayakumar et al. | |
| 8,719,142 B1 | 5/2014 | Odom | |
| 8,924,559 B2 | 12/2014 | Brown et al. | |
| 8,925,808 B2 | 1/2015 | Harrell | |
| 9,021,554 B2 | 4/2015 | Cassidy et al. | |
| 9,244,914 B2* | 1/2016 | Trumbull | G06F 16/213 |
| 9,286,375 B2* | 3/2016 | Rowley | G06F 16/289 |
| 9,292,587 B2* | 3/2016 | Kann | G06F 16/275 |
| 9,557,889 B2 | 1/2017 | Raleigh et al. | |
| 9,589,291 B1 | 3/2017 | Yalamanchi | |
| 9,607,058 B1* | 3/2017 | Gupta | G06Q 50/184 |
| 9,792,597 B1 | 10/2017 | Jen et al. | |
| 9,916,563 B1 | 3/2018 | Labanca, Jr. et al. | |
| 9,996,605 B2* | 6/2018 | Charron | G06F 16/285 |
| 10,083,198 B2* | 9/2018 | Yang | G06F 16/23 |
| 10,177,976 B2* | 1/2019 | Berly | H04L 41/0806 |
| 10,394,758 B2* | 8/2019 | Xing | G06F 16/128 |
| 2002/0074344 A1 | 6/2002 | Long et al. | |
| 2002/0077914 A1 | 6/2002 | Shatzkin et al. | |
| 2004/0225509 A1 | 11/2004 | Andre | |
| 2005/0222815 A1 | 10/2005 | Tolly | |
| 2006/0085294 A1 | 4/2006 | Boemer et al. | |
| 2007/0156538 A1 | 7/2007 | Peter et al. | |
| 2007/0185785 A1 | 8/2007 | Carlson et al. | |
| 2008/0243641 A1 | 10/2008 | Leno | |
| 2009/0171811 A1 | 7/2009 | Peter et al. | |
| 2009/0265251 A1 | 10/2009 | Dunlap et al. | |
| 2010/0023391 A1 | 1/2010 | Hudetz et al. | |
| 2010/0057554 A1 | 3/2010 | Lanford | |
| 2010/0070376 A1 | 3/2010 | Proud et al. | |
| 2011/0258083 A1 | 10/2011 | Ren | |
| 2013/0191230 A1 | 7/2013 | Edwards | |
| 2014/0244416 A1 | 8/2014 | Venkat et al. | |
| 2015/0154682 A1 | 6/2015 | Ram et al. | |
| 2015/0356484 A1 | 12/2015 | Velusamy et al. | |
| 2016/0162913 A1 | 6/2016 | Linden et al. | |
| 2016/0171540 A1 | 6/2016 | Mangipudi et al. | |

OTHER PUBLICATIONS

Non-Final Office Action dated Mar. 8, 2019, U.S. Appl. No. 15/447,037, of Reyelts, R., et al., filed Mar. 1, 2017.

Non-Final Office Action dated May 10, 2017, for U.S. Appl. No. 15/446,975, of Labanca, J. J., et al., filed Mar. 1, 2017.

Notice of Allowance dated Oct. 18, 2017, for U.S. Appl. No. 15/446,975, of Labanca, J. J., et al., filed Mar. 1, 2017.

Final Office Action dated Apr. 24, 2019, for U.S. Appl. No. 15/446,882, of Reyelts, R., et al., filed Mar. 1, 2017.

Non-Final Office Action dated Jun. 11, 2019, U.S. Appl. No. 15/447,037, of Reyelts, R., et al., filed Mar. 1, 2017.

Non-Final Office Action dated Mar. 4, 2016, for U.S. Appl. No. 14/964,198, of Jen, M., et al., filed Dec. 9, 2015.

Non-Final Office Action dated Dec. 1, 2016, for U.S. Appl. No. 14/964,198, of Jen, M., et al., filed Dec. 9, 2015.

Final Office Action dated Apr. 4, 2017, for U.S. Appl. No. 14/964,198, of Jen, M., et al., filed Dec. 9, 2015.

Notice of Allowance dated Jun. 16, 2017, for U.S. Appl. No. 14/964,198, of Jen, M., et al., filed Dec. 9, 2015.

\* cited by examiner

VERSION RECALL FOR COMPUTERIZED DATABASE MANAGEMENT

CROSS REFERENCE TO RELATED APPLICATION

This application is a continuation of and claims priority to U.S. Pat. No. 9,916,563, entitled "VERSION RECALL FOR COMPUTERIZED CATALOG MANAGEMENT", filed on Mar. 1, 2017, and issued on Mar. 13, 2018, the contents of which is incorporated herein by reference in its entirety.

BACKGROUND

Entities (e.g., merchants, service providers, etc.) offer items (i.e., goods, services, etc.) for acquisition (i.e., sale, rent, lease, etc.) by customers. To understand what items an entity has available for acquisition, the entity may maintain an inventory of the items. In some examples, the entity may accomplish this via a computerized system that tracks inventory and provides point-of-sale functionality. The inventory may indicate a quantity of a particular item the entity has available. In some examples, the computerized system may be used to provide reports regarding sales and inventory. Accordingly, the entity may be able to determine whether it needs to order more of a particular item and/or the entity can understand inventory losses (e.g., due to theft of items, misplacing items, damage to items, etc.).

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
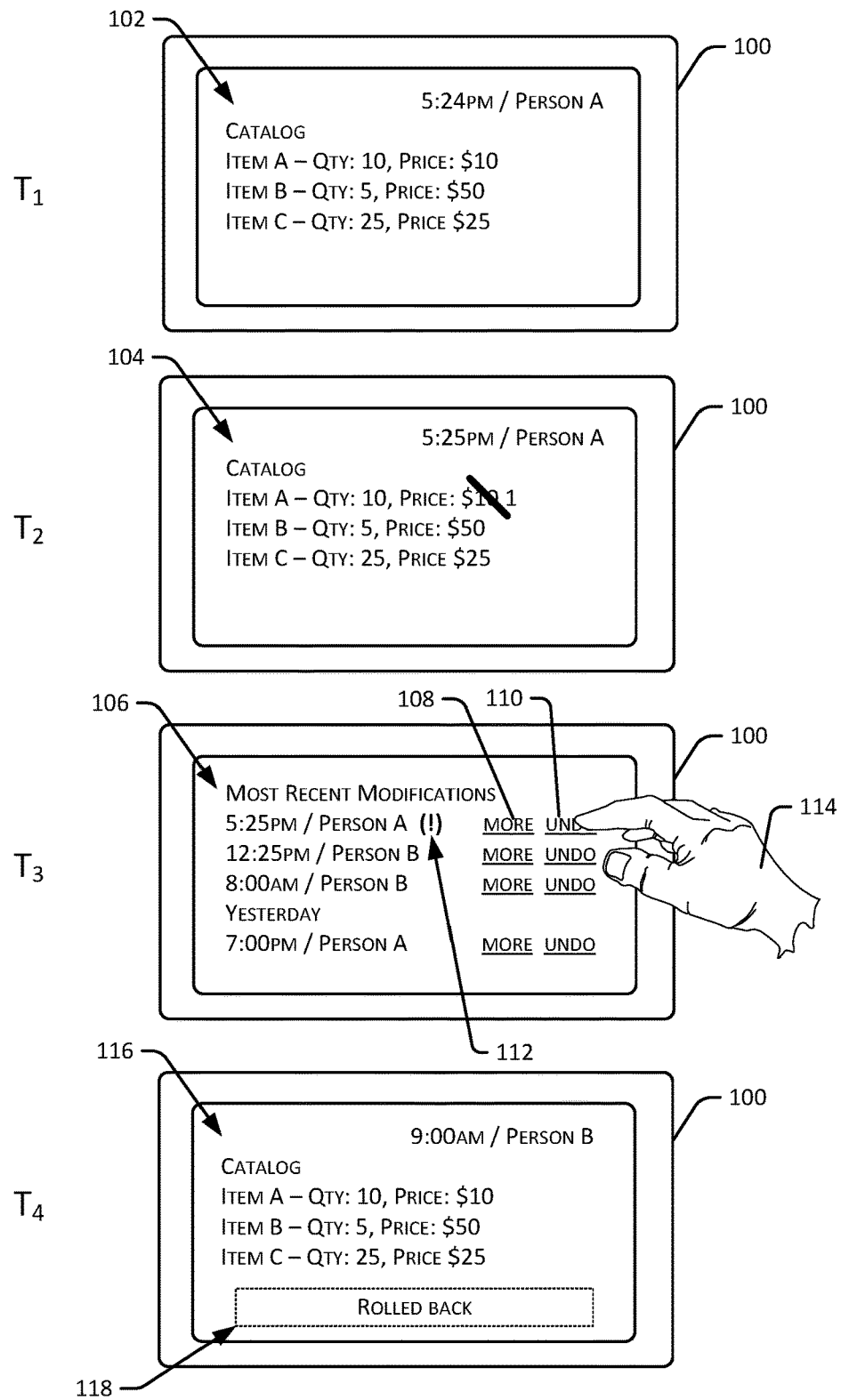
FIG. 1 depicts an illustrative block diagram illustrating version recall for computerized catalog management in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may offer a variety of services to help entities (e.g., merchants, service providers, etc.) streamline their businesses. In at least one example, a payment processing service may offer point-of-sale (POS) systems which are associated with various applications associated with the payment processing service that ease POS interactions with customers. A POS system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy, etc.) payment instruments. The POS terminal may provide a rich user interface, communicate with the payment reader, and also communicate with a server associated with the payment processing service. In this manner, the POS terminal and payment reader may collectively process transaction(s) between an entity and customer(s).

In some examples, the payment processing service may additionally and/or alternatively provide tools to enable entities to manage other aspects of their businesses. As examples, the payment processing service may provide tools for maintaining a catalog (i.e., catalog services) and/or an inventory (i.e., inventory services). A tool for maintaining a catalog may enable an entity to access and manage a database storing data associated with items that the entity has available for acquisition (i.e., a catalog). In at least one example, as described below, the catalog may include a plurality of data items and a data item of the plurality of data items may represent an item that the entity has available for acquisition. The data item may identify the item and may be associated with additional data that represents information about the item. For instance, the additional data may include attribute(s) of the item, a price of the item, a discount available for the item, taxes applicable to the item, a location of the item (e.g., where the item is located in a warehouse), image(s) of the item, etc. In at least one example, attribute(s) may correspond to variants of the item and may be represented by attribute values. A creator of a catalog may arbitrarily specify attribute names and allowed values for each of the attributes, dependent on the actual characteristics of an item. For instance, attribute names may include "color" and "size" and attribute values may include "red" or "green" or "small," "medium," or "large," for each attribute name, respectively.

The payment processing service may provide various access points to an entity so that the entity can access and manage its catalog. As a non-limiting example, the payment processing service may enable an entity to access and manage its catalog via a web interface, a user interface presented via a POS system operated by the entity, etc. In at least one example, the catalog may be shared with potential customers and/or may be utilized for creating purchase orders for the items. Additionally and/or alternatively, descriptive information about the items may be imported for inclusion in catalogs associated with other entities.

Additionally and/or alternatively, the payment processing service may provide an entity with a tool for managing its inventory. That is, the payment processing service may provide inventory tracking and reporting via such a tool. A tool for managing inventory may enable an entity to access and manage a database storing data associated with a quantity of each item that the entity has available (i.e., an inventory). The entity may update the inventory following an inventory activity (i.e., where entities associated with the entity manually determine quantities of each of the items that the entity has available), upon receiving new item(s) that are to be offered for acquisition, after item(s) are acquired by customers, etc. In additional and/or alternative examples, the payment processing service may update the inventory based on information received from the entity and/or other sources and/or systems. For instance, in some examples, the payment processing service may track individual instances of an item as the instance moves through entity(s) associated with a product supply chain.

In at least one example, the inventory may include additional information associated with items in the inventory. For instance, data associated with such additional information may include current ownership (i.e., which entity in the product supply chain has the item), location, sale-related events, etc. In some examples, the catalog may cross-reference the inventory. That is, in some examples, the additional data associated with an item may include a quantity associated with the item as indicated in the inventory and/or additional information that is available via the inventory.

The payment processing service may provide various access points to an entity so that the entity can access and manage its inventory. As a non-limiting example, the payment processing service may enable an entity to access and manage its inventory via a web interface, a user interface presented via a POS system operated by the entity, etc. In at least one example, the inventory may be useful for generating inventory reports regarding items in the inventory of an entity.

In some examples, various agents (e.g., sales associates, employees, independent contractors, etc.) associated with an entity may interact with the catalog and/or the inventory. For instance, an agent associated with an entity may input new data into the catalog upon receiving new item(s), modify a price of an item in the catalog, indicate a discount available for an item in the catalog, etc. Techniques described herein are directed to enabling an entity to view modifications that have been made to its catalog. That is, techniques described herein are directed to generating user interfaces that enable an entity to review what modifications have been made to a catalog, who made the modifications, when the modifications were made, etc. For the purpose of this discussion, a modification may correspond to one or more changes that affect the state of the catalog. That is, a modification may affect changes to various data items and/or additional information associated with the data items. A change may affect a single data item or a single piece of additional information associated with a data item.

In at least one example, an agent associated with an entity may inadvertently edit a catalog. For instance, as non-limiting examples, an agent may add too many new items to the catalog, reduce the price of an item too much, or indicate too large of a discount. In such examples, the entity may desire to recall a previous version of the catalog (i.e., a version prior to effectuating the modification). Currently, to recall a previous version of a catalog, an entity may call a customer service number associated with a payment processing service and may request that the payment processing service recall a previous version of the catalog. An agent (e.g., customer service associate, employee, independent contractor, etc.) associated with the payment processing service may access a modification log, identify which previous version of the catalog the entity desires, and manually recall the previous version of the catalog.

Techniques described herein are directed to a self-service rollback mechanism. That is, as described herein, a payment processing service may leverage machine learning mechanisms to determine when a modification is likely to warrant a rollback. In an example, a machine learning mechanism may be trained on previous rollback requests of an entity and/or a plurality of entities to determine characteristics of modifications that are likely to warrant rollbacks. Furthermore, based at least in part on determining that a modification is likely to warrant a rollback, the payment processing service may effectuate a rollback to a previous version of the catalog. That is, techniques described herein are directed to automating a task: recalling a previous version of a catalog of an entity.

For the purpose of this discussion, a rollback corresponds to accessing a previous version of a catalog of an entity. In at least one example, the payment processing service may capture a state of a catalog after each modification. Each state corresponds to a version of the catalog. Each version of the catalog may be stored in a database corresponding to a log of previous versions of the catalog. Each entry in the log may correspond to a previous version of the catalog. Upon receiving a rollback request, the payment service provider may access a previous version of the catalog and may create a new entry in the log of previous versions. That is, the new entry may represent a state of the catalog prior to a modification associated with a rollback request.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram illustrating version recall for computerized catalog management in accordance with some examples of the present disclosure. FIG. 1 illustrates a device 100 operated by an entity with different user interfaces.

At a first time ($T_1$), an agent (e.g., person A) associated with an entity accesses a first user interface 102 that is presented via a display of the device 100. As described above, in some examples, the agent may access the first user interface 102 via a web interface. In other examples, the agent may access the first user interface 102 via a POS system operated by the entity.

The first user interface 102 may graphically present at least a portion of a catalog associated with the entity. As illustrated, the catalog may include three items (e.g., item A, item B, item C). Each item corresponds to a data item in the catalog. As described above, each data item may be associated with additional data, including but not limited to, quantity of a corresponding item, price of the corresponding item, attributes of the corresponding item, shipping information associated with the corresponding item, location of the corresponding item (e.g., where the item is located in a warehouse), taxes applicable for the corresponding item, discounts available for the corresponding item, image(s) of the corresponding item, etc. In at least one example, the quantity information may be accessible from an inventory associated with the entity, as described above.

At a second time ($T_2$) that is after the first time ($T_1$), the agent (e.g., person A) may modify the catalog. A second user interface 104, which may be the same user interface as the first user interface 102, or a new user interface 104, may be presented via the display of the device 100. The second user interface 104 may show that the agent changed the price of item A from $10 to $1. An agent may make more than one change to the catalog and, in examples where the agent makes more than one change to the catalog, the changes may be associated with different items and/or different information associated with different items. That is, a modification may be associated with one or more changes to the catalog. Additionally, in at least one example, different agents (e.g., person A and another person) may make modifications to the catalog at a same time or within a threshold period of time. In such examples, the second user interface 104 may illustrate various modifications to the catalog and may identify which agent is associated with each modification.

At a third time ($T_3$) that is after the first time ($T_1$) and the second time ($T_2$), an agent associated with the entity may indicate that he or she desires to roll back the catalog. In at least one example, an agent may access the catalog and may determine that there is an error. In such examples, the agent may send a request, via the device 100, indicating that he or she desires to roll back the catalog. In other examples, a payment processing service, described below, may automatically determine that a modification is likely to warrant a rollback, without receiving input from the entity.

In either example, a third user interface 106 may be presented via the display of the device 100. The third user interface 106 may present at least a portion of a modification log associated with previous modifications to the catalog. As shown in the third user interface 106, a modification was made at 8:00 am, 12:25 pm, and 5:25 pm on the current day and at 7:00 pm on the day prior. In at least one example, an entry corresponding to each modification may be associated with an identity of an agent responsible for the corresponding modification and one or more controls, hyperlinks, etc. that enable an agent to take an action with respect to the corresponding modification. For instance, the most recent modification (i.e., made at 5:25 pm) was made by person A. An agent may interact with a first hyperlink 108 to learn more about the modification. For instance, if an agent actuates the first hyperlink 108, a pop-up, overlay, etc. may be presented to the agent. The pop-up, overlay, etc. may identify changes made to the catalog in association with the modification. In the example in FIG. 1, the pop-up, overlay, etc. may indicate that person A modified the price of item A from $10 to $1.

In some examples, an entry in the modification log may be representative of more than one change to the catalog. For instance, in at least one example, an entry in the modification log may be associated with a plurality of changes made to the catalog in a session associated with an agent and/or within a threshold period of time. A session may correspond to a period of time between when an agent logs into a payment processing service account associated with the agent and/or the entity and when the agent logs out of the payment processing service account. In at least one example, based at least in part on actuation of the first hyperlink 108, modification data associated with each change of the plurality of changes may be presented via the pop-up, overlay, etc. Modification data may identify the modification, an agent responsible for the modification, a time associated with the modification, an application associated with the modification (e.g., iOS application, web application, etc.), etc.

In at least one example, the third user interface 106 may include a control, hyperlink, etc. to enable an agent to request a rollback. For instance, if the agent desires to request a rollback, the agent may actuate a second hyperlink 110. Based at least in part on actuation of the second hyperlink 110, the device 100 may send a request to the payment processing service to effectuate a rollback to a previous version of the catalog. As shown in FIG. 1, an agent 114 interacts with the second hyperlink 110 to request a rollback. While the agent 114 is shown as touching a region of the third user interface 106 that corresponds to the second hyperlink 110, any interaction (e.g., gaze input, speech input, mouse/pointing device input, etc.) may actuate the second hyperlink 110.

In examples where the payment processing service identifies that a modification is likely to warrant a rollback, the third user interface 106 may include a graphical indicator 112 that corresponds to one of the modifications. The graphical indicator 112 may indicate that the modification is likely to warrant a rollback. That is, the graphical indicator 112 may indicate that the modification is likely erroneous and a previous version of the catalog should be recalled.

At a fourth time ($T_4$) that is after the first time ($T_1$), the second time ($T_2$), and the third time ($T_3$), a fourth user interface 116 may be presented via the display. The fourth user interface 116 may present a previous version of the catalog. In at least one example, the previous version of the catalog may correspond to the version of the catalog immediately preceding the modification. As shown in FIG. 1, the fourth user interface 116 is the same user interface as the first user interface 102. In some examples, the fourth user interface 116 may include a graphical indicator 118 indicating that the catalog has been rolled back to a previous version. In some examples, the graphical indicator 118 may be temporarily presented to alert the agent of the rollback.

The user interfaces (e.g., 102, 104, 106, and 116) are non-limiting examples of user interfaces that may be presented for facilitating version recall for computerized catalog management. Additional and/or alternative presentations and/or configurations may be imagined. Furthermore, graphical representations and/or indicators presented via the user interfaces (e.g., 102, 104, 106, and 116) are non-limiting examples of said graphical representations and/or indicators, and additional and/or alternative graphical representations and/or indicators may be imagined.

Figure 2:
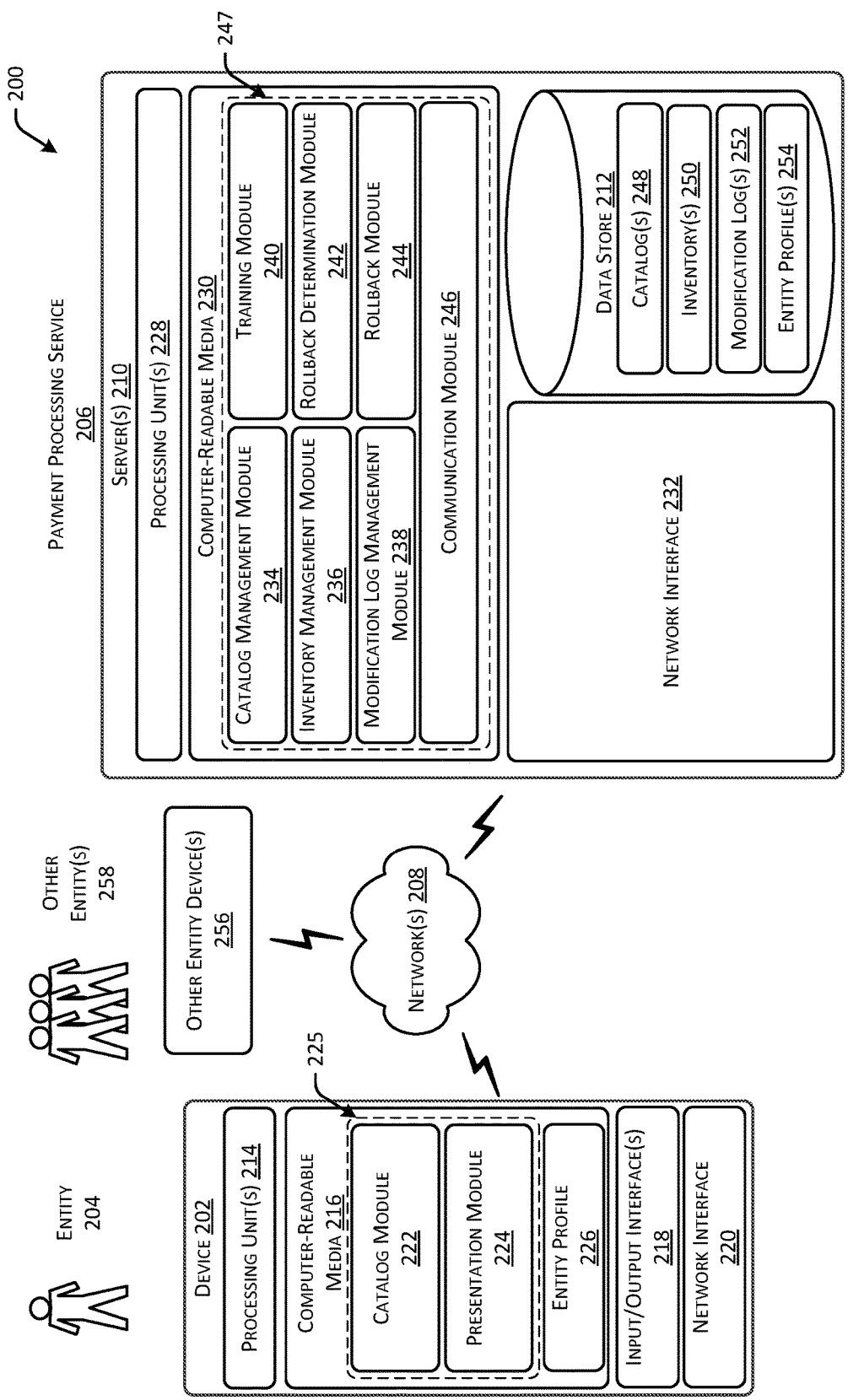
FIG. 2 depicts an illustrative block diagram of a catalog management system in accordance with some examples of the present disclosure.

FIG. 2 depicts an illustrative block diagram of a catalog management system 200 in accordance with some examples of the present disclosure. The catalog management system 200 may include a device 202 operated by an entity 204, which is communicatively coupled to a payment processing service 206 via network(s) 208.

Device 202 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, device 202 may be a point-of-sale (POS) terminal, which may be connected to a payment reader device. That is, in at least one example, device 202 may be associated with a POS system. In such an example, the payment reader device may be capable of accepting a variety of payment instruments, such as credit cards, debit cards, gift cards, short-range communication based payment instruments, and the like. In one example, payment reader device may be a wireless communication device that communicates wirelessly with an interactive electronic device such as a device 202, for example, using Bluetooth®, BLE, NFC, RFID, etc. In another example, payment reader device may be coupled to an interactive electronic device such as a device 202, for example, by being insertable into a connector mechanism (e.g., phone jack, headphone jack, etc.) of a smart phone or tablet. That is, in other examples, the payment reader device may be coupled to the device 202 via a wired connection. The payment reader device may interact with a payment instrument via a tap, dip, or swipe to obtain payment data associated with a customer.

As described above, an entity 204 may be a merchant, service provider, etc. that offers items for acquisition by customer(s). An item may be a good or a service. A customer may acquire an item by purchasing the item, renting the item, leasing the item, etc. In at least one example, the entity 204 may be associated with one or more agents, such as sales associates, employees, independent contractors, etc., which may interact with device 202 on behalf of the entity 204. The entity 204 (i.e., an agent of the entity 204) may interact with the device 202 to process transactions and/or manage other aspects of the entity's business via tools available by the payment processing service 206. The payment processing service 206 may include one or more servers 210, including a data store 212, described below.

Device 202 may include processing unit(s) 214, computer-readable media 216, input/output interface(s) 218, and a network interface 220. The processing unit(s) 214 of the device 202 may execute one or more modules and/or processes to cause the device 202 to perform a variety of functions, as set forth above and explained in further detail in the following disclosure. In some examples, the processing unit(s) 214 may include a central processing unit (CPU), a graphics processing unit (GPU), both CPU and GPU, or other processing units or components known in the art. Additionally, each of the processing unit(s) 214 may possess its own local memory, which also may store program modules, program data, and/or one or more operating systems. Depending on the exact configuration and type of the device 202, the computer-readable media 216 may include volatile memory (such as RAM), non-volatile memory (such as ROM, flash memory, miniature hard drive, memory card, or the like), or some combination thereof. The device 202 may include a GPS sensor 220, for receiving geolocation and time information (i.e., location data) associated with the device 202. In various examples, the device 202 may also have input/output interface(s) 218. Examples of input/output interface(s) 218 may include a keyboard, a mouse, a pen, a voice input device, a touch input device, a display, etc. Furthermore, the device 202 may include a network interface 220 for interfacing with the network(s) 208, as described below.

In at least one example, the computer-readable media 216 may include one or more modules for facilitating version recall for computerized catalog management. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 214) to configure the device 202 to execute instructions and to perform operations described herein. The module(s) may include a catalog module 222 and a presentation module 224. In some examples, the catalog module 222 and the presentation module 224 may be associated with an entity application 225. In at least one example, the computer-readable media 216 may also include an entity profile 226.

The catalog module 222 may receive input from an entity 204 for managing a catalog associated with the entity 204. For instance, in some examples, an entity 204 may provide input for adding a new item to the catalog. In at least one example, the entity 204 may input data into a form configured to receive information about the new item, which may then be added to the catalog by the payment processing service 206. In additional and/or alternative examples, the entity 204 may provide input associated with a modification. For instance, a modification may correspond to a change to a quantity of an item, a price of an item, a discount applied to an item, etc. As described above, in at least one example, a modification may affect one or more changes to the catalog. The catalog module 222 may send instructions to the payment processing service 206. The instructions may identify a modification, an agent responsible for the modification, a time associated with the modification, an application associated with the modification, etc. Data identifying a modification, an agent responsible for the modification, a time associated with the modification, an application associated with the modification, etc. may correspond to modification data. In examples where a modification to a catalog is associated with more than one change to the catalog, modification data may identify each change, an agent responsible for each change, a time associated with each change, an application associated with each change, etc.

The presentation module 224 may present user interfaces via the device 202. As described above with respect to FIG. 1, various user interfaces may be presented via a display of the device 202. The presentation module 224 may receive instructions from the payment processing service 206 and may output user interface(s) based on the instructions. That is, the presentation module 224 may be configured to receive instructions from the payment processing service 206 and dynamically output and/or update user interface(s) based on the instructions. The presentation module 224 may also receive inputs corresponding to interactions with the various user interface(s) and may send indications of such inputs to the payment processing service 206.

The entity profile 226 may store data associated with an entity 204 including, but not limited to, data including information about the entity 204 (e.g., name of the entity, geographic location of the entity, types of goods or services offered by the entity, operating hours of the entity, an entity identifier, an entity category classification, etc.), information about events associated with the entity 204 (e.g., past and upcoming events, dates of events, locations of events, etc.), accounting information associated with the entity 204 (e.g., bank(s) that the entity banks with, etc.), contractual information associated with the entity 204 (e.g., terms of a contract between the entity and the payment service provider), transactional information associated with the entity 204 (e.g., transactions conducted by the entity, goods and/or service associated with the transactions, total spends of each of the transactions, parties to the transactions, dates, times, and/or locations associated with the transactions, etc.), etc. In some examples, at least a portion of the entity profile 226 may be stored in the data store 212.

As described above, the payment processing service 206 may include one or more servers 210. The server(s) 210 may include processing unit(s) 228, computer-readable media 230, and a network interface 232. The processing unit(s) 228 of the server(s) 210 may execute one or more modules and/or processes to cause the server(s) 210 to perform a variety of functions, as set forth above and explained in further detail in the following disclosure. In some examples, the processing unit(s) 228 may include a CPU, a GPU, both CPU and GPU, or other processing units or components known in the art. Additionally, each of the processing unit(s) 228 may possess its own local memory, which also may store program modules, program data, and/or one or more operating systems. Depending on the exact configuration and type of the server(s) 210, the computer-readable media 230 may include volatile memory (such as RAM), non-volatile memory (such as ROM, flash memory, miniature hard drive, memory card, or the like), or some combination thereof. The server(s) 210 may include a network interface 232 for interfacing with the network(s) 208, as described below.

In at least one example, the computer-readable media 230 may include one or more modules for facilitating version recall for computerized catalog management. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 228) to configure the server(s) 210 to execute instructions and to perform operations described herein. The module(s) may include a catalog management module 234, an inventory management module 236, a modification log management module 238, a training module 240, a rollback determination module 242, a rollback module 244, and a communication module 246. In some examples, the catalog management module 234, the inventory management module 236, the modification log management module 238, the training module 240, the rollback determination module 242, the rollback module 244, and the communication module 246 may be associated with a server-side application 247.

The catalog management module 234 may manage catalog(s) stored in the data store 212, described below. That is, in at least one example, the catalog management module 234 may receive instructions associated with modifying catalog(s) and may update catalog(s) based on the instructions. For instance, device 202 may send instructions to the payment processing service 206 which may identify a modification that is to be made to a catalog associated with the entity 204. As a result, the catalog management module 234 may modify the catalog consistent with the instructions. In some examples, the instructions may be received from devices associated with entities (e.g., device 202). In other examples, the instructions may be received from third-party sources or systems.

The inventory management module 236 may manage inventory(s) stored in the data store 212, described below. That is, in at least one example, the inventory management module 236 may receive instructions associated with modifying inventory(s) and may update respective inventory(s) based on the instructions. For instance, device 202 may send instructions to the payment processing service 206 which may identify a modification that is to be made to an inventory associated with the entity 204. As a result, the inventory management module 236 may modify the inventory consistent with the instructions. In some examples, the instructions may be received from devices associated with entities (e.g., device 202). In other examples, the instructions may be received from third-party sources or systems.

The modification log management module 238 may manage modification log(s) stored in the data store 212, described below. As described above, a modification log is associated with previous modifications to a catalog. Following a modification to a catalog associated with an entity (e.g., entity 204), the modification log management module 238 may capture a state of the catalog, which reflects the catalog inclusive of the modification. In at least one example, when the modification log management module 238 captures a state of a catalog, the modification log management module 238 may capture changes to the catalog from the immediately preceding state of the catalog. Each state corresponds to a version of the catalog. Each version of the catalog may be stored as an entry in a modification log stored in the data store 212. That is, each entry in the modification log of an entity (e.g., entity 204) may correspond to a previous version of the catalog corresponding to said entity.

In some examples, the modification log management module 238 may capture a state of the catalog after the lapse of a predetermined time interval, after a session associated with a particular agent associated with an entity, etc. A session may correspond to a period of time between when the particular agent logs into a payment processing service account associated with the particular agent and/or the entity and when the particular agent logs out of the payment processing service account. That is, the modification log management module 238 may capture a state of the catalog after the particular agent logs out of the payment processing service account and after having made one or more changes to the catalog. In other examples, the modification log management module 238 may capture the state of the catalog after each change, without regard to temporal proximity between changes or whether a same agent made changes in a session.

In at least one example, responsive to a request for a rollback, the modification log management module 238 may generate a duplicate of a previous version of a catalog. That is, responsive to a request for a rollback, the modification log management module 238 may add a new entry to a modification log associated with the entity 204 and the new entry may correspond to a previous version of the respective catalog.

The training module 240 may train one or more machine learning mechanisms. A machine learning mechanism may build, modify, or otherwise utilize a data model that is created from example inputs and makes predictions or decisions using the data model. In at least one example, a machine learning mechanism may be used to predict whether a modification is likely to warrant a rollback. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Furthermore, the data model may be trained based on modification logs associated with one or more entities and data associated with rollback requests of the one or more entities. Additional details associated with training such a machine learning mechanism are described below with reference to FIG. 3.

The training module 240 may train an additional machine learning mechanism for determining how to present a modification log to an entity. In at least one example, a machine learning mechanism may be used to predict what type of modification data an entity prefers to view and how much modification data the entity prefers to view. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The data model may be trained on modification logs associated with an entity and interactions between the entity and individual modification logs. Additional details associated with training such a machine learning mechanism are described below with reference to FIG. 4.

In an example, the rollback determination module 242 may leverage one of the data models described above to predict whether a modification is likely to warrant a rollback. That is, the rollback determination module 242 may access modification data associated with a modification and may determine whether the modification is likely to warrant a rollback. Additional details associated with determining whether a modification is likely to warrant a rollback are described below with reference to FIGS. 5 and 6.

The rollback module 244 may effectuate a rollback. In some examples, the rollback module 244 may effectuate a rollback in response to receiving a request for a rollback. In other examples, the rollback module 244 may automatically effectuate a rollback based on the rollback determination module 242 determining that a modification is likely to warrant a rollback. That is, in such examples, the rollback module 244 may not require input from an entity to effectuate a rollback. To effectuate a rollback, the rollback module 244 may determine a previous entry in a modification log associated with an entity (e.g., entity 204) and may instruct the modification log management module 238 to add a new entry to the modification log that is a duplicate of the previous entry.

In at least one example, the previous entry corresponds to an entry immediately preceding a most recent modification. That is, in such an example, the rollback module 244 may determine a previous entry in the modification log that immediately precedes a most recently added entry and may instruct the modification log management module 238 to add a new entry to the modification log that is a duplicate of the previous entry. The new entry may correspond to the entry immediately preceding the most recent modification. That is, the new entry may correspond to the previous version of the catalog immediately preceding the modification to the catalog. In an alternative example, the previous entry may correspond to an entry immediately preceding any modification that the entity 204 desires to rollback. In such an example, the modification log management module 238 may add a new entry to the modification log that is a duplicate of the previous entry. In such an example, all modifications to the catalog that are subsequent to the modification associated with the rollback may also be rolled back.

In at least one example, a rollback request may be independent from any particular modification. For instance, in at least one example, a rollback request may be associated with a time interval. As a non-limiting example, an entity may request to roll back to a state of a corresponding catalog five hours prior, twelve hours prior, one day prior, etc. In such examples, the rollback module 244 may determine an entry in the modification log that is within a threshold of the desired rollback time interval (i.e., an entry within a threshold of five hours prior, twelve hours prior, one day prior, etc.) and may effectuate a rollback to a version of the catalog that immediately precedes the entry.

The communication module 246 may send instructions to the device 202 for presenting various user interfaces, such as the user interfaces described above with reference to FIG. 1. Additional details associated with instructions sent via the communication module 246 are described below.

The server(s) 210 may further include a data store 212. The data store 212 may be configured to store data so that it may be accessible, manageable, and updatable. In at least one example, the data store 212 may include a database associated with one or more catalogs 248, a database associated with one or more inventories 250, a database associated with one or more modification logs 252, and a database associated with one or more entity profiles 254.

The catalog(s) 248 may be associated with a database storing one or more catalogs. As described above, each entity may be associated with a catalog. A catalog of an entity (e.g., entity 204) may identify the items that the entity has available for acquisition at a particular time. A catalog may include a plurality of data items and a data item of the plurality of data items may represent an item that an entity (e.g., entity 204) has available for acquisition. Each data item may identify a respective item and may be associated with additional data that represents information about the respective item. For instance, the additional data may include attribute(s) of the respective item, a price of the respective item, a discount available for the respective item, taxes applicable for the respective item, image(s) of the respective item, etc.

The inventory(s) 250 may be associated with a database storing one or more inventories. As described above, each entity may be associated with an inventory. An inventory may enable an entity (e.g., entity 204) to know the quantity of each item that the entity has available at a particular time. In some examples, a catalog associated with an entity may cross-reference an inventory associated with the entity. That is, in some examples, the additional data associated with an item in a catalog of an entity may include a quantity associated with the item as indicated in the inventory.

The modification log(s) 252 may be associated with a database storing one or more modification logs. As described above, each entity may be associated with a modification log. A modification log of an entity (e.g., entity 204) is associated with previous modifications to a catalog associated with the entity. As described above, a modification log of an entity may include one or more entries. Each entry corresponds to a previous version of a catalog associated with the entity. In at least one example, each entry may be associated with modification data associated with a modification that caused the generation of the entry. For instance, an entry may be associated with modification data identifying change(s) to the catalog from an immediately preceding version of the catalog, an agent responsible for each of the change(s), a time associated with the each of the change(s), an application associated with each of the change(s), etc. In at least one example, the data may indicate whether the entry was associated with a rollback request.

The entity profile(s) 254 may be associated with a database storing one or more entity profiles. As described above, each entity may be associated with an entity profile. An entity profile may store data associated with an entity 204 including, but not limited to, data including information about the entity 204 (e.g., name of the entity, geographic location of the entity, types of goods or services offered by the entity, operating hours of the entity, an entity identifier, an entity category classification, etc.), information about events associated with the entity 204 (e.g., past and upcoming events, dates of events, locations of events, etc.), accounting information associated with the entity 204 (e.g., bank(s) that the entity banks with, etc.), contractual information associated with the entity 204 (e.g., terms of a contract between the entity and the payment service provider), transactional information associated with the entity 204 (e.g., transactions conducted by the entity, goods and/or service associated with the transactions, total spends of each of the transactions, parties to the transactions, dates, times, and/or locations associated with the transactions, etc.), etc. In some examples, at least a portion of an entity profile may be stored on a device associated with an entity (e.g., device 202).

In at least one example, an entity profile may store data associated with a corresponding entity's requests to access its modification log. Furthermore, in some examples, an entity profile may store data associated with interactions between the corresponding entity and the modification log. For instance, the data associated with interactions between the corresponding entity and the modification log may indicate which entries in the modification log an entity reviewed, requested additional information about, skimmed over, etc.

Network(s) 208 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 208 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, the device 202 and/or the payment processing service 206 may communicatively couple to network(s) 208 in any manner, such as by a wired or wireless connection. Network(s) 208 may also facilitate communication between the device 202 and the payment processing service 206. In turn, network interfaces (e.g., network interface 220 and network interface 232) may be any network interface hardware components that may allow the device 202 and/or the server(s) 210 to communicate over the network(s) 208.

In at least one example, one or more other entity devices 256 may be communicatively coupled to the device 202 and payment processing service 206 via the network(s) 208. Each of the one or more other entity devices 256 may be operated by one or more other entity(s) 258. As described below with reference to FIG. 4, data associated with modifications to catalogs associated with the other entity(s) 258 and data associated with rollback requests by the other entity(s) 258 may be used for training a machine learning mechanism for determining whether a modification is likely to warrant a rollback.

Figure 3:
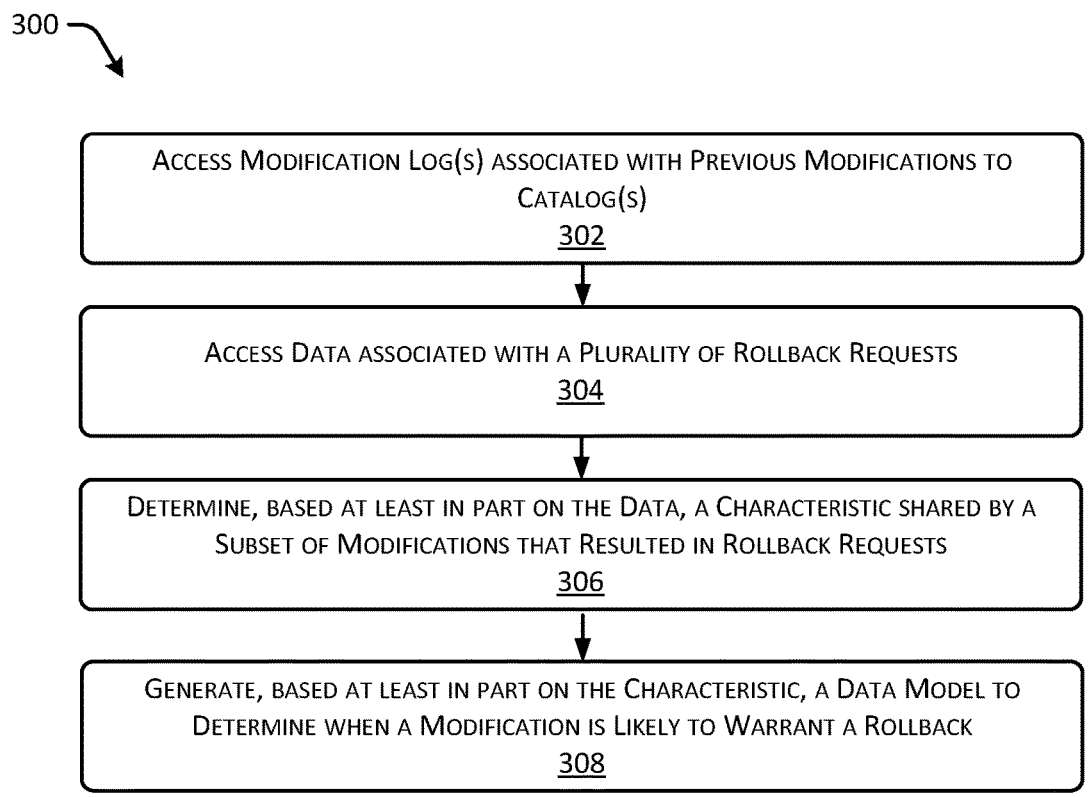
FIG. 3 depicts a non-limiting flow diagram illustrating a method for training a machine learning mechanism in accordance with some examples of the present disclosure.

FIG. 3 depicts a non-limiting flow diagram illustrating a method 300 for training a machine learning mechanism in accordance with some examples of the present disclosure. FIG. 3 is illustrated in the catalog management system 200 described above with reference to FIG. 2; however, FIG. 3 should not be limited to such a catalog management system. As described above, the training module 240 may train a machine learning mechanism, which may be used to predict whether a modification is likely to warrant a rollback.

Block 302 illustrates accessing modification log(s) 252 associated with previous modifications to catalog(s). In at least one example, the training module 240 may access, from the data store 212, modification log(s) 252. As described above, the modification log(s) 252 may represent individual modification logs respectively corresponding to individual entities. In some examples, the training module 240 may access a modification log associated with a single entity. In other examples, the training module 240 may access modification logs associated with one or more entities. In at least one example, the one or more entities may share a characteristic. For instance, the one or more entities may be associated with a same geographic location, a same entity category classification, a same item available for acquisition, etc. One or more entities that share a characteristic may be a cohort.

Block 304 illustrates accessing data associated with a plurality of rollback requests. The training module 240 may access data associated with a plurality of rollback requests. In at least one example, the training module 240 may access rollback requests corresponding to the same entities for which the training module 240 accessed modification log(s). That is, if the training module 240 accessed a modification log of a single entity, the training module 240 may access rollback requests associated with the same entity. Or, if the training module 240 accessed modification logs associated with a plurality of entities, the training module 240 may access rollback requests associated with the same plurality of entities. In at least one example, data associated with a rollback request may include a first version of a catalog prior to the rollback request, a second version of the catalog after the rollback request, and modification data associated with the modification to the first version of the catalog that caused the generation of the second version of the catalog.

Block 306 illustrates determining, based at least in part on the data, a characteristic shared by a subset of modifications that resulted in rollback requests. The training module 240 may leverage a machine learning mechanism to determine a characteristic shared by a subset of modifications that resulted in rollback requests. In at least one example, the training module 240 may utilize supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. for learning the characteristic.

In at least one example, the characteristic may correspond to a time interval. For instance, as a non-limiting example, the machine learning mechanism may learn that modifications made between 2:00 am and 4:00 am tend to be laden with errors and consequently, generally result in rollback requests. In another example, the characteristic may be a change or changes to the catalog that affect or affects more than a threshold number of items in the catalog. For instance, as a non-limiting example, the machine learning mechanism may learn that changes that affect more than half of the items in entities' catalogs generally result in rollback requests. In yet another example, the characteristic may be a change to information associated with an item that exceeds a threshold. For instance, as a non-limiting example, the machine learning mechanism may learn that changes to prices associated with items that exceed a threshold, changes to discounts available for items that exceed a threshold, changes to taxes associated with items that exceed a threshold, etc. generally result in rollback requests. Further, the characteristic may be a number of changes across the catalog that exceeds a threshold. For instance, as a non-limiting example, the machine learning mechanism may learn that numbers of changes across a catalog that exceed a threshold generally result in rollback requests. In yet another example, the characteristic may correspond to a particular agent (e.g., a particular sales associate, an agent having a particular title, etc.). For instance, the machine learning mechanism may learn that modifications associated with a particular agent generally result in rollback requests. Additional and/or alternative characteristics may be imagined. In some examples, combinations of characteristics may be indicative of whether a rollback may be warranted.

Block 308 illustrates generating, based at least in part on the characteristic, a data model to determine when a modification is likely to warrant a rollback. The training module 240 may generate a data model based at least in part on the characteristic and/or a combination of characteristics. In examples where a combination of characteristics is determined to be indicative of warranting a rollback request, individual of the characteristics may be associated with different weights. For instance, if a first characteristic tends to be more indicative of warranting a rollback request than a second characteristic, the first characteristic may be weighted more heavily than the second characteristic.

In at least one example, applying modification data associated with a modification to the data model may generate an output of a probability or other value indicative of whether a modification is likely to warrant a rollback. A probability closer to one may indicate that the modification is likely to warrant a rollback and a probability closer to zero may indicate that the modification is not likely to warrant a rollback. In some examples, applying modification data associated with a modification to the data model may generate an output of a binary code (zero or one) to indicate whether the modification is likely to warrant a rollback. In such examples, a zero may indicate that the modification is not likely to warrant a rollback and a one may indicate that the modification is likely to warrant a rollback.

In examples where the training module 240 accesses a modification log associated with an entity and data associated with rollback requests made by the entity, the characteristic may be specific to the entity. Accordingly, the resulting data model may be specific to the entity. In examples where the training module 240 accesses modification logs associated with one or more entities and data associated with rollback requests made by the one or entities, the characteristic may be associated with the one or more entities. Accordingly, the resulting data model may be specific to the one or more entities. If the one or more entities share a characteristic (e.g., geographic location, entity category classification, item that is available for acquisition, etc.), the one or more entities may belong to a cohort. In such examples, the resulting data model may be specific to the cohort of entities.

Figure 4:
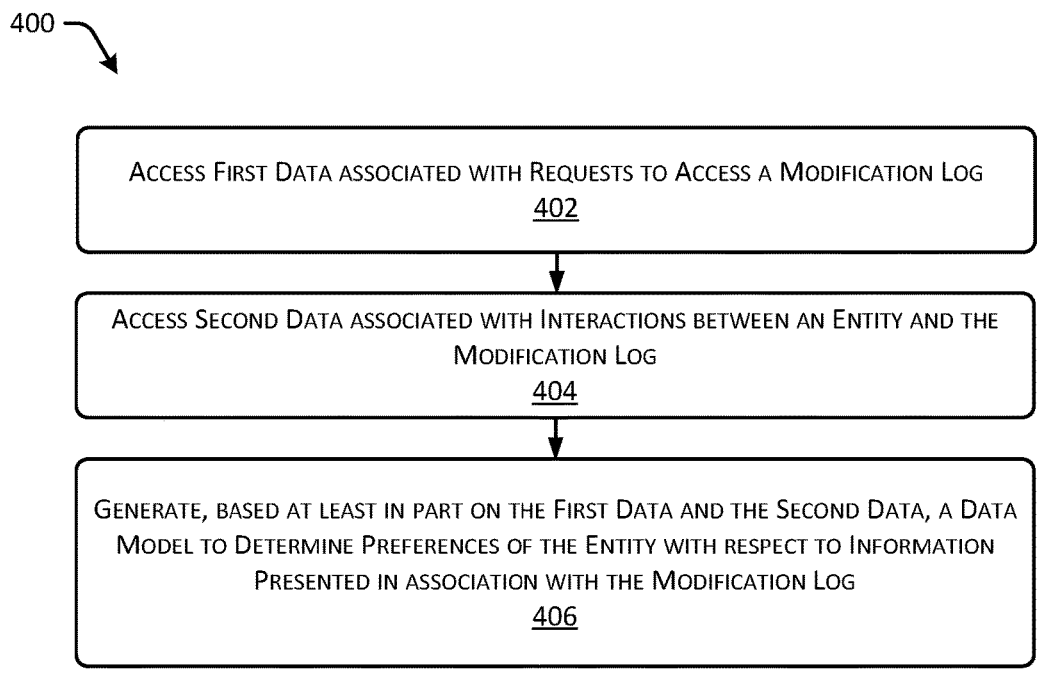
FIG. 4 depicts a non-limiting flow diagram illustrating a method for training another machine learning mechanism in accordance with some examples of the present disclosure.

FIG. 4 depicts a non-limiting flow diagram illustrating a method 400 for training another machine learning mechanism in accordance with some examples of the present disclosure. FIG. 4 is illustrated in the catalog management system 200 described above with reference to FIG. 2; however, FIG. 4 should not be limited to such a catalog management system. In some examples, an entity may have preferences with respect to what information is surfaced via a user interface associated with a modification log and/or how the information is presented. Accordingly, as described above, in at least one example, a machine learning mechanism may be used to predict what type of modification data an entity prefers to view and how much modification data the entity prefers to view when viewing a graphical representation of a modification log.

Block 402 illustrates accessing first data associated with requests to access a modification log. In at least one example, the training module 240 may access entity profile(s) 254 to access data in an entity profile that is associated with an entity's requests to access its modification log.

Block 404 illustrates accessing second data associated with interactions between an entity and the modification log. In at least one example, the training module 240 may access the entity profile(s) 254 to access data in an entity profile that is associated with interactions between the entity and the modification log. For instance, the data associated with interactions between the entity and the modification log may indicate which entries in the modification log an entity reviewed, requested additional information about, skimmed over, etc. Such information may be indicative as to whether an entity finds a corresponding entry to be associated with a significant modification. For the purpose of this discussion, a significant modification may correspond to a modification that the entity is likely to want to review in more detail, with more time, etc. than other modifications. In some examples, an entity profile may include data associated with entries that an entity has expressly indicated to be associated with significant modifications and/or entries that an entity has expressly indicated to be associated with insignificant modifications.

Block 406 illustrates generating, based at least in part on the first data and the second data, a data model to determine preferences of the entity with respect to information presented in association with the modification log. In at least one example, the training module 240 may use a machine learning mechanism may build, modify, or otherwise utilize a data model that is created from example inputs and makes predictions or decisions using the data model. In at least one example, a machine learning mechanism may be used to predict how to present a modification log to an entity based on preferences of the entity. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In at least one example, the machine learning mechanism may learn types of modifications that an entity considers to be significant modifications. For instance, in at least one example, the machine learning mechanism may learn that an entity requests access to modifications that are associated with a particular agent. Accordingly, modifications associated with the particular agent may be considered significant modifications. As such, modifications associated with the particular agent should be included in a presentation of the modification log and, in some examples, when presenting modifications associated with the particular agent, more information about the modifications associated with the particular agent may be presented than for other modifications associated with other agents. Or, in at least one example, the machine learning mechanism may learn that an entity requests access to modifications that affect more than a threshold number of items in the catalog. Accordingly, modifications associated with the more than a threshold number of items in the catalog may be considered significant modifications. As such, modifications associated with more than a threshold number of items should be included in a presentation of the modification log. In another example, the machine learning mechanism may learn that an entity requests access to modifications that change information associated with an item by more than a threshold. Accordingly, modifications that change information associated with an item by more than a threshold may be considered significant modifications. As such, modifications that change information associated with an item by more than a threshold should be included in a presentation of the modification log. Or, the machine learning mechanism may learn that an entity skims over modifications that affect quantities of items. Accordingly, such modifications may not be significant modifications. As such, when presenting the modification log, modifications that affect quantities may be excluded from the modification log.

In at least one example, the communication module 246 may utilize the resulting data model described above to determine information to surface via a user interface associated with a modification log and generate instructions corresponding to such a user interface. In some examples, fewer than all modifications may be surfaced via the user interface. In such examples, an entity may be presented with an option (e.g., via the user interface) to access a complete modification log including all modifications.

Figure 5:
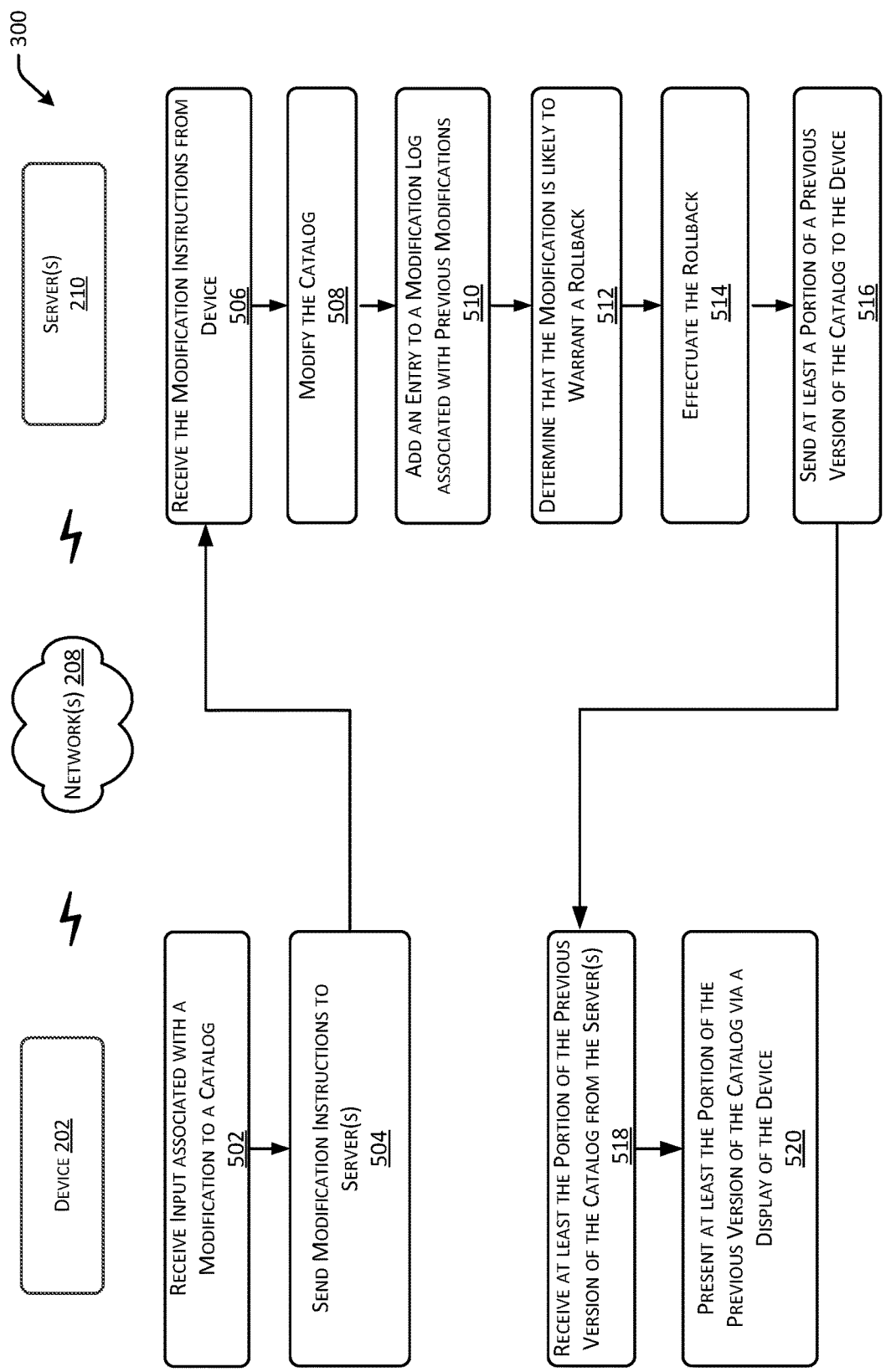
FIG. 5 depicts a non-limiting flow diagram illustrating a method for version recall for computerized catalog management in accordance with some examples of the present disclosure.

FIG. 5 depicts a non-limiting flow diagram illustrating a method 500 for version recall for computerized catalog management in accordance with some examples of the present disclosure. FIG. 5 is illustrated in the catalog management system 200 described above with reference to FIG. 2; however, FIG. 5 should not be limited to such a catalog management system.

Block 502 illustrates receiving input associated with a modification to a catalog. As described above, the catalog module 222 may receive input from an entity 204 (i.e., an agent acting on behalf of the entity 204) for managing a catalog associated with the entity 204. For instance, in some examples, an entity 204 may provide input for adding a new item to the catalog. Or, in other examples, the entity 204 may provide input associated with a modification. For instance, a modification may correspond to a change to a quantity of an item, a price of an item, a discount applied to an item, etc. In some examples, a modification may correspond to more than one change, as described above.

Block 504 illustrates sending modification instructions to server(s) 210. The catalog module 222 may send instructions to the server(s) 210 associated with the payment processing service 206. The instructions may identify a modification, an agent responsible for the modification, a time associated with the modification, an application associated with the modification, etc. In at least one example, the catalog module 222 may send instructions to the server(s) 210 after each modification to the catalog. In other examples, the catalog module 222 may send instructions to the server(s) 210 after the lapse of a predetermined time interval, after a session associated with an agent, etc. That is, the catalog module 222 may send instructions to the server(s) that include all modifications associated with a time interval, a session, etc. In such examples, each modification may be associated with modification data indicating which agent is responsible for the respective modification, a time associated with the respective modification, etc. In examples where a modification corresponds to more than one change, modification data may identify each change, an agent responsible for each change, a time associated with each change, an application associated with the modification, etc.

Block 506 illustrates receiving the modification instructions from device 202. The catalog management module 254 may receive the modification instructions.

Block 508 illustrates modifying the catalog. The catalog management module 254 may utilize the modification instructions to update the catalog. For instance, if the modification instructions are associated with a first change to a price of a first item, a second change to a quantity of a second item, and an addition of a third item to the catalog, the catalog management module 254 may modify data associated with the price of the first item in the catalog, modify data associated with the quantity of the second item in the catalog, and add a new data item corresponding to the third item to the catalog.

Block 510 illustrates adding an entry to a modification log associated with previous modifications. Responsive to the catalog management module 254 modifying the catalog, the modification log management module 258 may add an entry to the modification log associated with the entity 204. As described above, a modification log associated with an entity 204 may include a plurality of entries and each entry may correspond to a previous version of the catalog. The entry added to the modification log may identify the modification, an agent responsible for the modification, a time associated with the modification, an application associated with the modification, etc. In examples where a modification corresponds to more than one change, the entry may identify each change, an agent responsible for each change, a time associated with each change, an application associated with the change, etc.

Block 512 illustrates determining that the modification is likely to warrant a rollback. The rollback determination module 242 may leverage a machine learning mechanism (e.g., described above with reference to FIG. 3) to predict whether a modification is likely to warrant a rollback. That is, the rollback determination module 242 may access modification data associated with the modification and may determine whether the modification is likely to warrant a rollback. Additional details associated with determining whether a modification is likely to warrant a rollback are described below with reference to FIG. 6.

Block 514 illustrates effectuating the rollback. The rollback module 244 may effectuate a rollback. In some examples, the rollback module 244 may effectuate a rollback in response to receiving a request for a rollback. In other examples, the rollback module 244 may automatically effectuate a rollback based on the rollback determination module 242 determining that a modification is likely to warrant a rollback. That is, in such examples, the rollback module 244 may not require input from an entity to effectuate a rollback. To effectuate a rollback, the rollback module 244 may determine a previous entry in a modification log associated with an entity (e.g., entity 204) and may instruct the modification log management module 258 to add a new entry to the modification log that is a duplicate of the previous entry. In at least one example, the previous entry corresponds to an entry immediately preceding a most recent modification. That is, in such an example, the rollback module 244 may determine a previous entry in the modification log that immediately precedes a most recently added entry and may instruct the modification log management module 258 to add a new entry to the modification log that is a duplicate of the previous entry. Additional details associated with effectuating a rollback are described below with reference to FIG. 6.

Block 516 illustrates sending at least a portion of a previous version of the catalog to the device 202. In at least one example, the communication module 246 may send instructions associated with presenting at least a portion of a previous version of the catalog to the device 202. The previous version of the catalog corresponds to the version of the catalog associated with the new entry.

Block 518 illustrates receiving at least a portion of the previous version of the catalog from the server(s) 210. The presentation module 224 may receive the instructions associated with presenting at least the portion of the previous version of the catalog.

Block 520 illustrates presenting at least the portion of the previous version of the catalog via a display of the device 202. The presentation module 224 may output a user interface based on the instructions. The user interface may graphically represent at least the portion of the previous version of the catalog that, in at least one example, corresponds to an immediately preceding version of the catalog. In some examples, a graphical indicator may be associated with the user interface, which may indicate that a rollback occurred, as described above with reference to FIG. 1.

It should be noted that in some examples, the rollback module 244 may effectuate a rollback and may not communicate the rollback to the entity until a later time. Or, the rollback module 244 may effectuate a rollback and send a notification (e.g., email, text message, push notification, etc.) to the entity notifying the entity that the rollback is complete. That is, in some examples, the communication module 246 may refrain from sending instructions for presenting the previous version of the catalog via the device 202 operated by the entity 204 and instead send a notification or some other indication of the rollback.

Figure 6:
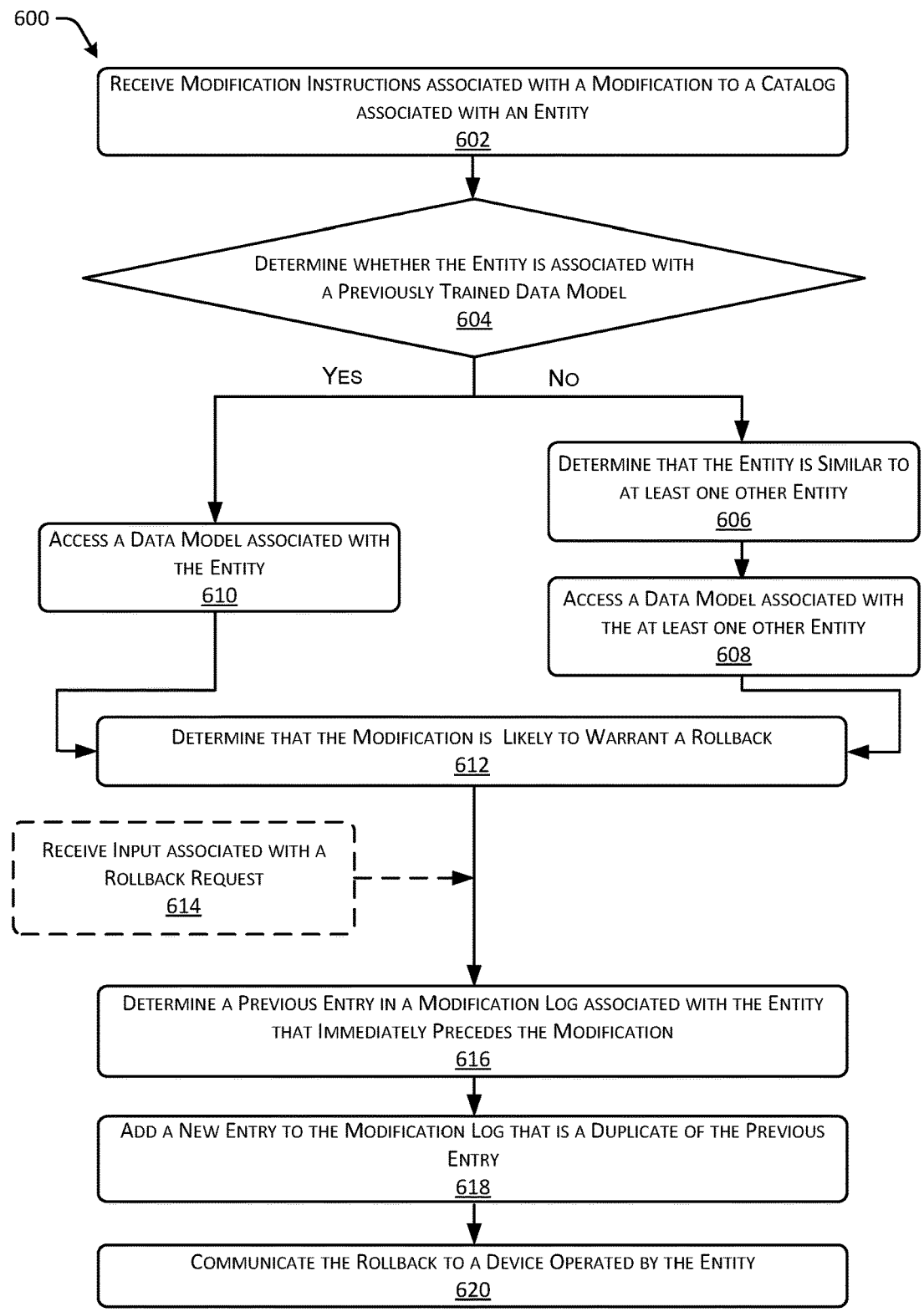
FIG. 6 depicts a non-limiting flow diagram illustrating a method for determining that a modification is likely to warrant a rollback in accordance with some examples of the present disclosure.

FIG. 6 depicts a non-limiting flow diagram illustrating a method 600 for determining that a modification is likely to warrant a rollback in accordance with some examples of the present disclosure. FIG. 6 is illustrated in the catalog management system 200 described above with reference to FIG. 2; however, FIG. 6 should not be limited to such a catalog management system.

Block 602 illustrates receiving modification instructions associated with a modification to a catalog associated with an entity 204. As described above, the catalog module 222 may receive input from an entity 204 (i.e., an agent acting on behalf of the entity 204) for managing a catalog associated with the entity 204. For instance, in some examples, an entity 204 may provide input for adding a new item to the catalog. Or, in other examples, the entity 204 may provide input associated with a modification. For instance, a modification may correspond to a change to a quantity of an item, a price of an item, a discount applied to an item, etc. The catalog module 222 may send instructions to the catalog management module 234. The instructions may identify a modification, an agent responsible for the modification, a time associated with the modification, an application associated with the application, etc. As described above, in at least one example, a modification may include more than one change to the catalog. Accordingly, in such an example, the instructions may identify each of the changes, an agent responsible for each of the changes, a time associated with each of the changes, an application associated with each of the changes, etc.

Block 604 illustrates determining whether an entity is associated with a previously trained data model. Based at least in part on determining that the entity is not associated with a previously trained data model, the rollback determination module 242 may determine that the entity is similar to at least one other entity, as illustrated in block 606.

In some examples, an entity 204 may be a new entity such that the entity has not yet registered with the payment processing service 206 and/or has less than a threshold amount of data associated with a corresponding entity profile. In at least one example, a new entity may input some data upon registering with the payment processing service 206 (e.g., location, entity category classification, one or more items available for acquisition, etc.), however, the payment processing service 206 may not yet have information associated with modifications to a corresponding catalog, etc. Accordingly, in such examples, there may not be enough information to train a data model that is specific to the entity 204. As such, the rollback determination module 242 may utilize data that is available for the entity 204 and may compare it with data associated with other entities 258. In at least one example, the rollback determination module 242 may determine that the entity 204 shares at least one characteristic with another entity and/or a cohort of entities. For instance, the entity 204 may be at a same location or within a threshold distance of the location of the other entity and/or the cohort of entities. Or, the entity may be associated with a same entity category classification as the other entity and/or the cohort of entities.

Block 608 illustrates accessing a data model associated with the at least one other entity. As a result of determining that an entity 204 is similar to at least one other entity, the rollback determination module 242 may utilize a data model corresponding to the at least one other entity for determining whether a modification is likely to warrant a rollback. In some examples, the rollback determination module 242 may utilize the data model corresponding to the at least one other entity until more than a threshold amount of data is associated with the entity profile corresponding to the entity 204 and a personalized data model may be generated for the entity 204.

In other examples, the training module 240 may have previously generated a data model specific to the entity 204. In such examples, the rollback determination module 242 may access the data model specific to the entity 204 for determining whether the modification is likely to warrant a rollback, as illustrated in block 610.

Block 612 illustrates determining that the modification is likely to warrant a rollback. As described above, the training module 240 may leverage a machine learning mechanism to learn a characteristic shared by a subset of modifications that resulted in rollback requests. In at least one example, the characteristic may correspond to a time interval. In another example, the characteristic may be a change to the catalog that affects more than a threshold number of items in the catalog. In yet another example, the characteristic may be a change to information associated with an item that exceeds a threshold. Further, the characteristic may be a number of changes across the catalog that exceeds a threshold. In yet another example, the characteristic may correspond to a particular agent (e.g., a particular sales associate, an agent having a particular title, etc.). In some examples, combinations of characteristics may be indicative of whether a rollback may be warranted. The training module 240 may generate a data model based at least in part on the characteristic and/or combination of characteristics, as described above. In some examples, the data model may be specific to the entity 204. In other examples, the data model may be specific to at least one entity that is similar to the entity 204.

The rollback determination module 242 may apply the applicable data model to modification data associated with the modification. That is, the rollback determination module 242 may determine one or more characteristics associated with the modification and based at least in part on the one or more characteristics associated with the modification, the data model may determine whether the modification is likely to warrant a rollback. In at least one example, the data model may output a probability or other value indicative of whether the modification is likely to warrant a rollback. A probability closer to one may indicate that the modification is likely to warrant a rollback and a probability closer to zero may indicate that the modification is not likely to warrant a rollback. In some examples, the data model may output a binary code (zero or one) indicate whether the modification is likely to warrant a rollback. In such examples, a zero may indicate that the modification is not likely to warrant a rollback and a one may indicate that the modification is likely to warrant a rollback.

Block 614 illustrates receiving input associated with a rollback request. In some examples, the rollback module 244 may receive input associated with a rollback request. For instance, in at least one example, the communication module 246 may send instructions to the presentation module 224 to indicate that the modification is likely to warrant a rollback. In some examples, the instructions may be associated with at least a portion of a modification log associated with the entity 204. In at least one example, the instructions may be based at least in part on leveraging a machine learning mechanism (e.g., described above with reference to FIG. 4) that is trained to determine information for surfacing via a user interface associated with a modification log of an entity. The instructions may instruct the presentation module 224 to graphically present the portion of the modification log with an indication that the modification is likely to warrant a rollback. The presentation module 224 may present a user interface that graphically presents the portion of the modification log via a display of a device operated by the entity 204 (e.g., device 202). A non-limiting example of such a user interface is illustrated and described above with respect to FIG. 1 (e.g., user interface 106). In other examples, the instructions may be associated with adding an indicator to a user interface that is being presented. That is, the instructions may instruct the presentation module 224 to update a user interface that is presenting at least a portion of a modification log.

The entity 204 may interact with the user interface to determine and review previous modifications associated with the catalog. In at least one example, the user interface may include a control, hyperlink, or other mechanism that enables the entity 204 to send a request to rollback a particular modification. The presentation module 224 may determine an actuation of the control, hyperlink, or other mechanism and may send an input to the rollback module 244 indicating a rollback request.

In some examples, the rollback determination module 242 may send an indication to the rollback module 244 instructing the rollback module 244 to effectuate a rollback without receiving an input from the device 202 operated by the entity 204. In such examples, process 600 may proceed directly from block 612 to block 616.

Block 616 illustrates determining a previous entry in a modification log associated with the entity that immediately precedes the modification. To effectuate a rollback, the rollback module 244 may determine a previous entry in a modification log associated with an entity (e.g., entity 204). In at least one example, the previous entry corresponds to an entry immediately preceding a most recent modification. That is, the previous entry may correspond to a version of the catalog prior to the modification.

Block 618 illustrates adding a new entry to the modification log that is a duplicate of the previous entry. To further effectuate the rollback, the rollback module 244 may instruct the modification log management module 238 to add a new entry to the modification log that is a duplicate of the previous entry. As described above, in at least one example, the previous entry corresponds to an entry immediately preceding a most recent modification. In such an example, the rollback module 244 may determine a previous entry in the modification log that immediately precedes a most recently added entry and may instruct the modification log management module 238 to add a new entry to the modification log that is a duplicate of the previous entry.

Block 620 illustrates communicating the rollback to a device operated by the entity. In at least one example, the communication module 246 may send instructions associated with presenting at least a portion of a previous version of the catalog to the device 202. The previous version of the catalog corresponds to the version of the catalog associated with the new entry. The presentation module 224 may receive the instructions associated with presenting at least the portion of the previous version of the catalog. The presentation module 224 may output a user interface based on the instructions. The user interface may graphically represent at least the portion of the previous version of the catalog that, in at least one example, corresponds to an immediately preceding version of the catalog. In some examples, a graphical indicator may be associated with the user interface, which may indicate that a rollback occurred.

As described above, it should be noted that in some examples, the rollback module 244 may effectuate a rollback and may not communicate the rollback to the entity until a later time. Or, the rollback module 244 may effectuate a rollback and send a notification (e.g., email, text message, push notification, etc.) to the entity notifying the entity that the rollback is complete. That is, in some examples, the communication module 246 may refrain from sending instructions for presenting the previous version of the catalog via the device 202 operated by the entity 204 and instead send a notification or some other indication of the rollback.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. One or more database management systems comprising:
   one or more databases;
   one or more processors; and
   one or more computer-readable media storing instructions executable by the one or more processors, wherein the instructions program the one or more processors to:
      add, responsive to receiving an input to modify a database of the one or more databases, a first new entry to a modification log, the first new entry corresponding to a new version of the database;
      determine that at least a portion of a modification to the database resulting from the input is likely to warrant a rollback;
      determine a previous entry of the modification log that precedes the first new entry, the previous entry corresponding to a previous version of the database preceding the modification to the database; and
      add a second new entry to the modification log, the second new entry corresponding to the previous version of the database preceding the modification to the database.

2. The one or more database management systems of claim 1, wherein the database comprises an inventory database or a catalog database.

3. The one or more database management systems of claim 1, the instructions further program the one or more processors to:
   train a machine learning mechanism prior to receiving the input, wherein training the machine learning mechanism comprises:
      accessing modification logs associated with previous modifications to databases associated with a plurality of entities;
      accessing data associated with a plurality of rollbacks associated with the previous modifications;
      determining, based at least in part on the data, that a subset of modifications that resulted in rollbacks of the plurality of rollbacks is associated with a characteristic; and
      training a data model based at least in part on the characteristic, the data model predicting when a new modification is likely to warrant a new rollback; and
   determine that at least the portion of the modification to the database resulting from the input is likely to warrant the rollback based at least in part on the data model.

4. The one or more database management systems of claim 3, wherein the characteristic is a time interval.

5. The one or more database management systems of claim 3, wherein the characteristic is at least one change that affects more than a threshold number of database entries.

6. The one or more database management systems of claim 3, wherein the characteristic is a change to at least one aspect of a database entry, the change exceeding a threshold.

7. The one or more database management systems of claim 3, wherein the characteristic is a number of changes exceeding a threshold.

8. The one or more database management systems of claim 3, wherein:
   the input is associated with an entity;
   the entity and the plurality of entities share at least one characteristic; and
   the at least one characteristic corresponds to a geographic location or a merchant category classification.

9. The one or more database management systems of claim 1, the instructions further program the one or more processors to:
   send, to a device operated by a merchant associated with the input, an indication that at least the portion of the modification to the database resulting from the input is likely to warrant the rollback;
   receive a request to effectuate the rollback; and
   responsive to receiving the request, add the second new entry to the modification log.

10. A method comprising:
   receiving, at one or more servers associated with a payment processing service, an input to modify a database associated with one or more items of a merchant;
   adding, responsive to receiving the input to modify the database and by the one or more servers, a first new entry to a modification log, the first new entry corresponding to a new version of the database;
   determining, by the one or more servers, that at least a portion of a modification to the database resulting from the input is likely to warrant a rollback;
   determining, by the one or more servers, a previous entry of the modification log that precedes the first new entry, the previous entry corresponding to a previous version of the database preceding the modification to the database; and
   adding, by the one or more servers, a second new entry to the modification log, the second new entry corresponding to the previous version of the database preceding the modification to the database.

11. The method of claim 10, further comprising:
sending at least a portion of the modification log to an application executing on a device operated by the merchant, the application graphically presenting at least the portion of the modification log via a user interface output via a display of the device, the user interface including a graphical representation identifying the first new entry corresponding to the modification as likely warranting the rollback;
receiving, from the device, a rollback request associated with the first new entry corresponding to the modification; and
in response to receiving the rollback request, adding the second new entry to the modification log.

12. The method of claim 10, further comprising adding the second new entry to the modification log based at least in part on determining that the modification to the database is likely to warrant the rollback, without additional input.

13. The method of claim 10, further comprising sending, to an application executing on a device operated by the merchant, an indication of the rollback.

14. The method of claim 10, further comprising:
training a machine learning mechanism to determine when modifications are likely to warrant rollbacks; and
determining that the modification to the database is likely to warrant the rollback based at least in part on the machine learning mechanism.

15. The method of claim 10, wherein the database is at least one of an inventory database or a catalog database.

16. A system comprising:
one or more processors; and
one or more computer-readable media storing instructions executable by the one or more processors, wherein the instructions program the one or more processors to:
receive an input to modify at least one of an inventory database or a catalog database of a merchant;
add, responsive to receiving the input to modify the at least one of the inventory database or the catalog database, a first new entry to a modification log, the first new entry corresponding to a new version of the at least one of the inventory database or the catalog database;
determine that at least a portion of a modification to the at least one of the inventory database or the catalog database resulting from the input is likely to warrant a rollback;
determine a previous entry of the modification log that precedes the first new entry, the previous entry corresponding to a previous version of the at least one of the inventory database or the catalog database preceding the modification to the at least one of the inventory database or the catalog database; and
add a second new entry to the modification log, the second new entry corresponding to the previous version of the at least one of the inventory database or the catalog database preceding the modification to the at least one of the inventory database or the catalog database.

17. The system of claim 16, further comprising:
sending at least a portion of the modification log to an application executing on a device operated by the merchant, the application graphically presenting at least the portion of the modification log via a user interface output via a display of the device, the user interface including a graphical representation identifying the first new entry corresponding to the modification as likely warranting the rollback;
receiving, from the device, a rollback request associated with the first new entry corresponding to the modification; and
in response to receiving the rollback request, adding the second new entry to the modification log.

18. The system of claim 16, further comprising adding the second new entry to the modification log based at least in part on determining that the modification to the at least one of the inventory database or the catalog database is likely to warrant the rollback, without additional input.

19. The system of claim 16, further comprising sending, to an application executing on a device operated by the merchant, an indication of the rollback.

20. The system of claim 16, further comprising:
training a machine learning mechanism to determine when modifications are likely to warrant rollbacks; and
determining that the modification to the at least one of the inventory database or the catalog database is likely to warrant the rollback based at least in part on the machine learning mechanism.

* * * * *